United States Patent [19]

Shimada et al.

[11] Patent Number: 5,245,953
[45] Date of Patent: Sep. 21, 1993

[54] EMULSION FUEL ENGINE

[75] Inventors: Taizo Shimada, Yokohama; Kiyoharu Yamada, Sagamihara; Yutaka Zaha, Yokohama, all of Japan

[73] Assignees: Mitsubishi Jidosha Kogyo Kabushiki Kaisha; Mitsubishi Jidosha Engineering Kabushiki Kaisha, Tokyo, Japan

[21] Appl. No.: 918,523

[22] Filed: Jul. 24, 1992

[30] Foreign Application Priority Data

| Jul. 31, 1991 | [JP] | Japan | 3-060325[U] |
| Jul. 31, 1991 | [JP] | Japan | 3-060327[U] |
| Jul. 31, 1991 | [JP] | Japan | 3-060328[U] |
| Jul. 31, 1991 | [JP] | Japan | 3-060565[U] |

[51] Int. Cl.⁵ ............................................. F02B 47/00
[52] U.S. Cl. .............................. 123/25 E; 123/25 C; 123/575
[58] Field of Search ............... 123/25 C, 25 E, 25 Q, 123/575, 1 A

[56] References Cited

U.S. PATENT DOCUMENTS

| 3,933,132 | 1/1976 | Keiji et al. | 123/25 C |
| 4,335,737 | 6/1982 | Power | 123/25 E |
| 4,388,893 | 6/1983 | Apfel | 123/25 E |
| 4,403,944 | 9/1983 | Pyykkönen | 123/25 E |
| 4,412,512 | 11/1983 | Cottell | 123/25 E |
| 4,416,225 | 11/1983 | Constantine | 123/25 C |
| 4,438,731 | 3/1984 | Maggio | 123/25 E |
| 4,705,010 | 11/1987 | Baranescu | 123/575 |
| 4,831,970 | 5/1989 | Caputo | 123/575 |
| 4,834,055 | 5/1989 | Steiger | 123/575 |
| 5,024,195 | 6/1991 | Pien | 123/575 |

FOREIGN PATENT DOCUMENTS

| 1958732 | 6/1970 | Fed. Rep. of Germany | 123/25 E |
| 56-142243 | 10/1981 | Japan. | |

Primary Examiner—E. Rollins Cross
Assistant Examiner—Erick Solis
Attorney, Agent, or Firm—Wegner, Cantor, Mueller & Player

[57] ABSTRACT

The invention relates to an emulsion fuel engine which uses an emulsion fuel as a fuel and contemplates provision of an emulsion fuel engine which prevents inadvertent failure in starting caused by separation of emulsion fuel and deterioration of the durability of parts of an injection system and is reduced in production of NOx or soot and in specific fuel consumption. The emulsion fuel engine comprises a fuel injection pump for supplying a first fuel to a fuel injection nozzle, and emulsion fuel supplying means for supplying an emulsion fuel, which is obtained by emulsifying the first fuel and a second fuel which is insoluble to the first fuel, to an injection pipe between the fuel injection pump and the fuel injection nozzle.

14 Claims, 10 Drawing Sheets

EMULSION FUEL ENGINE

BACKGROUND OF THE INVENTION

1) Field of the Invention

This invention relates to an emulsion fuel engine which uses an emulsion fuel as a fuel.

2) Description of the Related Art

To produce less exhaust gas and reduce the specific fuel consumption, diesel engines using an emulsion fuel are known. The term "emulsion fuel" as used herein means a fuel formed by emulsifying mutually-insoluble fuels, for example, water and diesel fuel, water and heavy oil, or methanol and diesel fuel.

Referring to FIG. 10, the construction of a conventional emulsion fuel engine will be described. The conventional emulsion fuel engine shown includes a fuel tank 1 in which an emulsion fuel (for example, water and diesel fuel) is stored. Arranged between the fuel tank 1 and an injection pump 2 is a fuel pipe FP which is provided with a fuel pump 3 for delivering the emulsion fuel and also with a fuel filter 4.

The injection pump 2 is provided with a reciprocating plunger 7 which moves up and down as a camshaft 5 rotates together with a cam 6. The injection pump 2 begins to draw the fuel after an upper end face of the plunger 7 has come to a position lower than a fuel draw/spill port 9. After the upper end face of the plunger 7 has moved to a position above the fuel draw/spill port 9, the injection pump 2 begins to deliver the fuel under pressure. When a lead 10 formed in a peripheral wall of the plunger 7 has overlapped the fuel draw/spill port 9, the injection pump 2 terminates the delivery of the fuel under pressure. Designated at numeral 11 is a delivery valve for the prevention of a reverse flow.

An injection pipe IP is arranged between a top portion of the injection pump 2 and an injection nozzle 12. A fuel feed channel 13 is formed inside the injection nozzle 12. Through the fuel feed channel 13, the fuel which has been delivered under pressure from the injection pipe IP is guided to a lower part of the nozzle 12. A needle valve 14 is lifted by the pressure of the fuel, whereby the fuel is injected into the combustion chamber through injector holes 15.

The fuel discharged from the injection pump 2 and the injection nozzle 12 is returned to the fuel tank 1 via a fuel return pipe 16.

In the conventional emulsion fuel engine, an emulsion fuel prepared in advance is merely stored in the fuel tank 1 instead of diesel fuel.

Further, when the emulsion fuel is left for a long time in the fuel tank 1, the diesel fuel and the water are separated from each other, and consequently, water is sometimes injected upon next starting of the engine, resulting in the problem that the conventional emulsion fuel engine is low in ignition performance and sometimes suffers from failure in starting.

A diesel engine injection system includes many parts operating in the fuel with micron-level clearances. An emulsion fuel with enclosed water droplet induces excess wear due to insufficient lubrication and rusting at the injection pump 2, resulting in the problem that the durability of the injection pump 2 is reduced.

At the injection nozzle 12, the injector holes 15 may be clogged by abraded particles formed by the excessive wear, leading to the problem that the durability of the injection nozzle 12 is reduced.

An apparatus is already known and disclosed, for example, in U.S. Pat. No. 3,933,132 wherein water or non-aqueous liquid is introduced to an arbitrary position between a delivery valve and a fuel injection nozzle and then the water or non-aqueous liquid is introduced into an injection pipe by a negative pressure produced by a fuel drawing back action of the delivery valve.

With the prior art apparatus, however, since only water or non-aqueous liquid is introduced directly into the injection pipe and then injected from the injection pipe together with fuel, the fuel and the water or non-aqueous liquid are not compulsorily mixed with each other but remain in a naturally mixed condition. As a result, it sometimes occurs that the fuel and the water or non-aqueous liquid are not mixed uniformly and only the water or non-aqueous liquid is injected by a large amount while the fuel is injected but by a small amount. In this case, the combustion itself may not be established and the original effect of reduction of NOx by use of the emulsion fuel cannot be anticipated sufficiently.

Another apparatus is also known and disclosed, for example, in Japanese Utility Model Laid-Open Application No. 56-142243 wherein such an auxiliary fuel as water or non-aqueous liquid as described above is not drawn in by a negative pressure caused by a drawing back action of a delivery valve but is fed under pressure and introduced to an arbitrary position from the delivery valve to injector holes of a fuel injection nozzle while adjusting the pressure of the auxiliary fuel in response to an operating condition of the engine by means of a pressure regulator.

The prior art apparatus is improved comparing with the apparatus disclosed in U.S. Pat. No. 3,933,132 in that the auxiliary fuel pressure can be adjusted in response to an operating condition of the engine. However, the apparatus still has similar subjects to those of the other apparatus described hereinabove.

SUMMARY OF THE INVENTION

It is an object of the present invention to provide an emulsion fuel engine which prevents inadvertent failure in starting caused by separation of emulsion fuel.

It is another object of the present invention to provide an emulsion fuel engine which prevents deterioration of the durability of parts of an injection system.

It is a further object of the present invention to provide an emulsion fuel engine which is reduced in production of NOx or soot and in specific fuel consumption.

In order to attain the objects, according to an aspect of the present invention, there is provided an emulsion fuel engine which comprises a fuel injection pump for supplying a first fuel to a fuel injection nozzle, and emulsion fuel supplying means for supplying an emulsion fuel, which is obtained by emulsifying the first fuel and a second fuel which is insoluble to the first fuel, to an injection pipe between the fuel injection pump and the fuel injection nozzle.

According to another aspect of the present invention, there is provided an emulsion fuel engine which comprises a first fuel tank for storing a first fuel therein, a second fuel tank for storing a second fuel therein, an injection nozzle provided for each cylinder, an injection pump communicated with the first fuel tank for feeding the first fuel from the first fuel tank under pressure toward the injection nozzle at a predetermined timing, mixing means for mixing the first fuel from the first fuel tank and the second fuel from the second fuel tank to form an emulsion fuel, and emulsion fuel supplying means for supplying the emulsion fuel from the mixing means to an injection pipe between the injection pump and the injection nozzle by way of a check valve.

Preferably, the first fuel is diesel fuel and the second fuel is water or methanol.

The emulsion fuel supplying means may include a pump for feeding the emulsion fuel under pressure to the injection pipe. In this instance, the diesel fuel is stored in the first fuel tank while water is stored in the second fuel tank, and when emulsion fuel is to be used, the diesel fuel and the water are joined at an intermediate position of the injection pipe between the injection pump and the injection nozzle so that they are mixed with each other to form an emulsion fuel, which is then injected through the injection nozzle.

The emulsion fuel engine may further comprise a free piston disposed in the injection pipe adjacent the injection pump with respect to a position at which the emulsion fuel is supplied to the injection pipe for preventing the emulsion fuel supplied to the injection pipe from moving to the injection pump side. Preferably, the free piston has a large diameter portion adjacent the injection pump and a small diameter portion adjacent the injection nozzle and transmits the pressure of the diesel fuel from the injection pump received at the large diameter portion thereof in a boosted condition to the emulsion fuel. In this instance, the diesel fuel is stored in the first fuel tank while water is stored in the second fuel tank, and when emulsion fuel is to be used, the diesel fuel and the water are joined at the position of the free piston disposed in the injection pipe between the injection pump and the injection nozzle so that they are mixed with each other to form an emulsion fuel, which is then injected through the injection nozzle.

The emulsion fuel engine may further comprise a solenoid valve interposed in an emulsion fuel pipe, which is provided to supply the emulsion fuel to the injection pipe, and operated for opening and closing movement, a position sensor arranged on the injection pipe adjacent the injection pump with respect to a position at which the emulsion fuel is supplied to the injection pipe for detecting the position of the emulsion fuel supplied to the injection pipe, and position controlling means for controlling the solenoid valve to open until the emulsion fuel is detected by the position sensor. In this instance, the solenoid valve interposed in the emulsion fuel pipe is controlled to open and close so that the emulsion fuel may come to the location at which the sensor is provided.

The emulsion fuel engine may further comprise a branch pipe connected to the injection pipe adjacent the injection pump with respect to a position at which the emulsion fuel is supplied to the injection pipe, a solenoid spill valve interposed in the branch pipe, and solenoid spill valve controlling means for controlling opening and closing movement of the solenoid spill valve to discharge the first fuel or the emulsion fuel in the injection pipe. Preferably, the distance L (mm) from the position at which the emulsion fuel is supplied to the injection pipe to the branch pipe is set to $L \geq 4q/\pi d^2$ where d is the inner diameter (mm) of the injection pipe and q is the amount (mm$^3$) of the emulsion fuel injected for each injection cycle. Preferably, the solenoid spill valve controlling means controls the solenoid spill valve to open for a predetermined period of each injection cycle to separate the injection cycle into a period of pilot injection and another period of main injection. In this instance, the diesel fuel is stored in the first fuel tank while water is stored in the second fuel tank, and when emulsion fuel is to be used, the diesel fuel and the water are joined at a junction intermediately of the injection pipe between the injection pump and the injection nozzle so that they are mixed with each other to form an emulsion fuel, which is then injected through the injection nozzle. The solenoid spill valve is connected to the branch pipe at a position adjacent the injection pipe with respect to the junction, and it is controlled to open and close in accordance with the necessity to separate each injection cycle into a period of pilot injection and another period of main injection, thereby to reduce the combustion noise.

The emulsion fuel engine may further comprise a constant-pressure valve arranged at an exit portion of the injection pump adjacent the injection pipe and having a bidirectional check valve mechanism.

The emulsion fuel engine of the construction is free from failure in starting arising from separation of emulsion fuel and prevents deterioration of the durability of parts of an injection system.

In summary, the emulsion fuel engine of the present invention is characterized in that water or nonaqueous liquid is mixed with fuel first and then the mixture is introduced into the injection pipe. Owing to the construction, for example, water and fuel are injected in a fully mixed condition into the combustion chamber. Consequently, the water and the fuel are spread uniformly in the combustion chamber, and since the water is present in the lighted fuel, the influence of the water upon combustion is exhibited sufficiently and a sufficient effect of reduction of NOx by the drop of the combustion temperature is achieved sufficiently. Furthermore, the water injected into the combustion chamber together with the fuel forms atomization in which it encloses the air therein, which contributes to improvement of the combustion of fuel and achieves reduction of soot and reduction of the specific fuel consumption.

DETAILED DESCRIPTION OF THE INVENTION AND THE PREFERRED EMBODIMENTS

Figure 1:
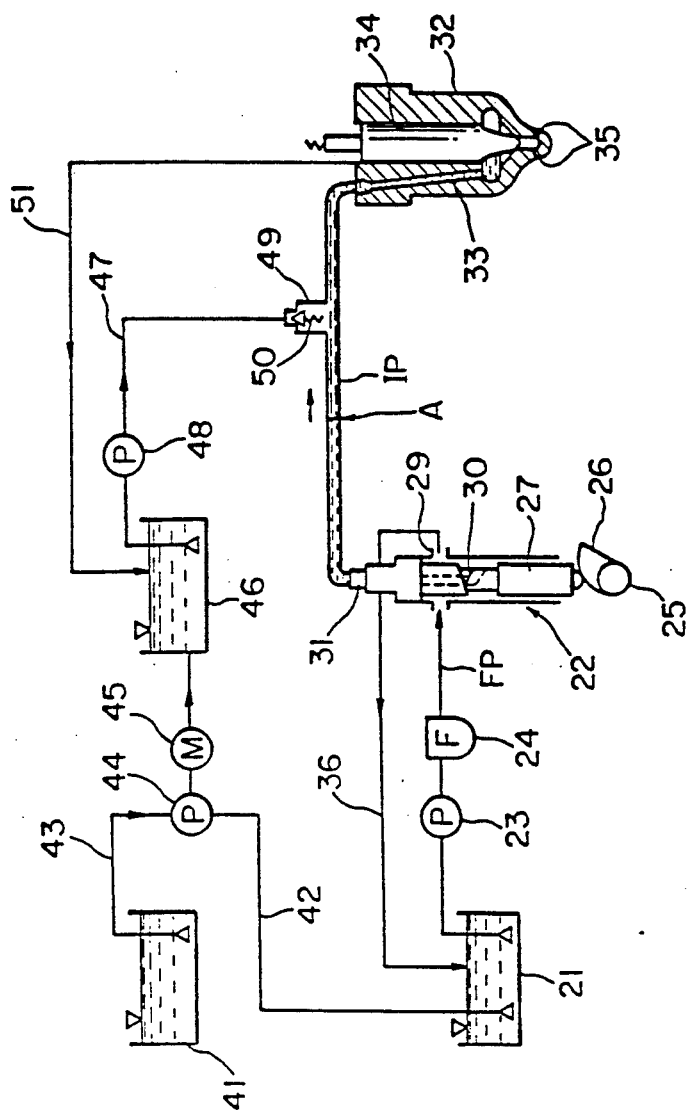
FIG. 1 is a block diagram of an emulsion fuel engine according to a first embodiment of the present invention.

Referring first to FIG. 1, there is shown an emulsion fuel engine according to a first preferred embodiment of the present invention. The emulsion fuel engine shown includes a fuel tank 21 in which diesel oil as a first fuel is stored. Arranged between the fuel tank 21 and an injection pump 22 is a fuel pipe FP which is provided with a fuel pump 23 for delivering the fuel and also with a fuel filter 24.

The injection pump 22 is provided with a plunger 27 which reciprocates up and down as a camshaft 25 rotates together with a cam 26. The injection pump 22 begins to draw the fuel after an upper end face of the plunger 27 has come to a position lower than a fuel draw/spill port 29. After the upper end face of the plunger 27 has moved to a position above the fuel draw/spill port 29, the injection pump 22 begins to deliver the fuel under pressure. When a lead 30 formed in a peripheral wall of the plunger 27 has overlapped the fuel draw/spill port 29, the injection pump 22 terminates the delivery of the fuel under pressure.

An injection pipe IP is arranged between a top portion of the injection pump 22 and an injection nozzle 32.

Figure 2:
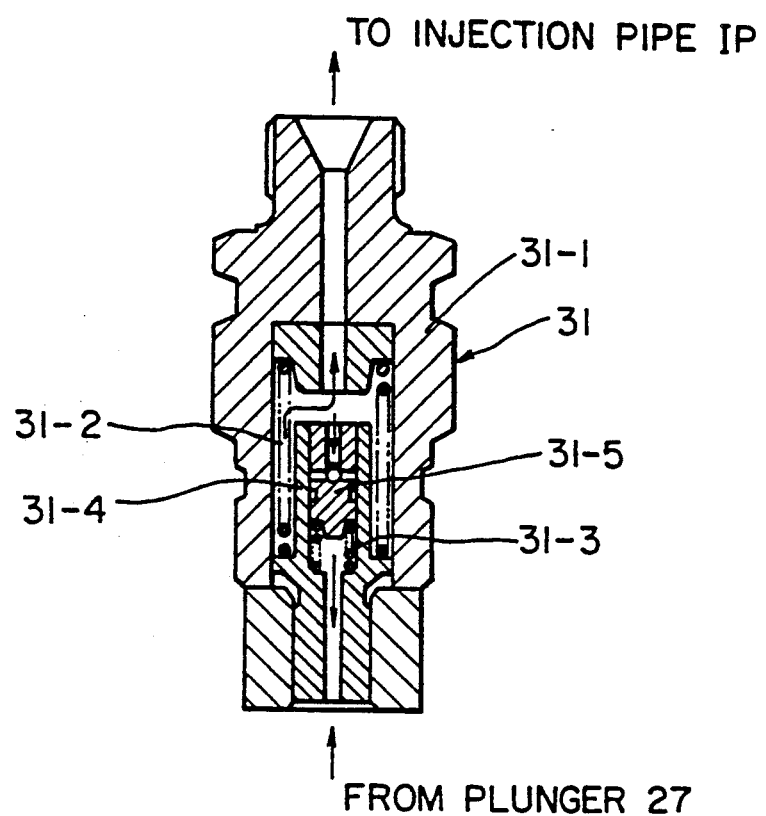
FIG. 2 is a cross sectional view of a constant-pressure valve having a bidirectional check valve mechanism.

A constant-pressure valve 31 having a bidirectional check valve mechanism serves to maintain the internal pressure of the injection pipe IP at a constant level and, as is illustrated in FIG. 2, is constructed of a housing 31-1, a first valve element 31-4 disposed in the housing 31-1 and biased by a first spring 31-2, and a second valve element 31-5 arranged in the first valve element 31-4 and biased by a second spring 31-3.

Owing to the construction as described above, the constant-pressure valve 31 operates as will be described next.

Upon initiation of an injection, the first valve element 31-4 is lifted against the spring force of the first spring 31-2 by the fuel fed under pressured from the plunger 27, whereby the fuel is fed to the injection pipe IP.

Upon completion of the injection, the first valve element 31-4 is brought to a valve-closing position by the first spring 31-2 and, at the same time, the second valve element 31-5 is depressed against the spring force of the second spring 31-3 by a residual fuel pressure in the injection pipe IP. The fuel inside the injection pipe IP is therefore returned. As soon as the residual fuel pressure in the injection pipe IP is lowered to the valve-closing pressure that the second valve element 31-4 is brought to a valve-closing position by the spring force of the second spring 31-3, the return of the fuel is stopped so that the internal pressure of the injection pipe IP is maintained at the valve-closing pressure.

A fuel feed channel 33 is formed inside the injection nozzle 32. The fuel which has been delivered under pressure from the injection pipe IP is introduced to a lower part of the nozzle 32 through the fuel feed channel 33. A needle valve 34 is lifted by the pressure of the fuel, whereby the fuel is injected into a combustion chamber through injector holes 35.

The fuel discharge from the injection pipe 22 is returned to the fuel tank 21 via a fuel return pipe 36.

Water as a second fuel is stored in a second fuel tank 41. Pipings 42, 43 with distal ends thereof extending to bottom parts of the first and second fuels tanks 21, 41, respectively, are connected at proximal ends thereof to suction ports of a pump 44, respectively. Via a mixer 45 where diesel fuel and water are agitated and emulsified into an emulsion fuel, a delivery port of the pump 44 is connected to an emulsion fuel tank 46 in which the emulsion fuel is stored.

A fuel pipe 47 one end of which is located in a bottom part of the emulsion fuel tank 46 is provided with a fuel pump 48, and the other end of the fuel pipe 47 is connected to the injection pipe IP at a junction 49. At the junction 49, there is provided a check valve 50 so that the emulsion fuel is allowed to enter the injection pipe IP when the pressure of the emulsion fuel in the fuel pipe 47 becomes higher than the pressure of the fuel in the injection pipe IP.

Further, the fuel discharged from the injection pipe 32 is returned to the emulsion fuel tank 46 via a fuel return pipe 51.

Figure 3:
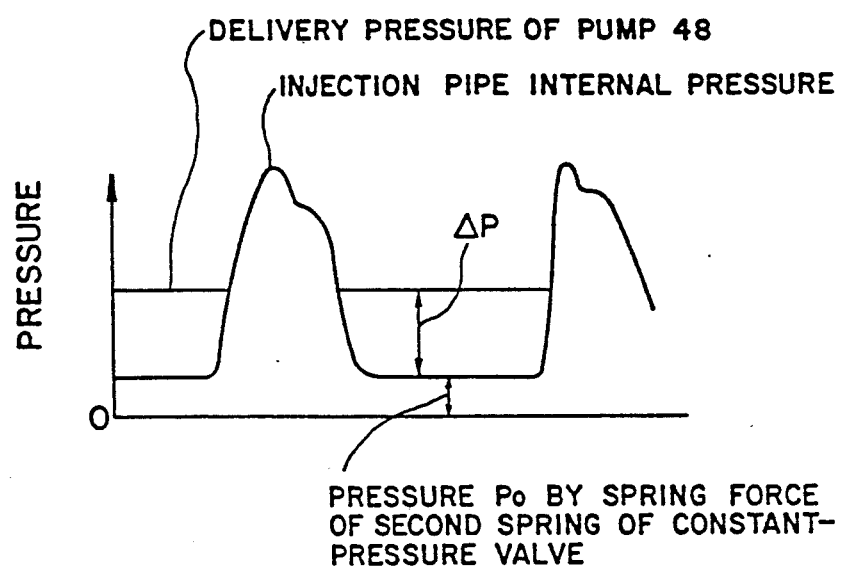
FIG. 3 is a diagram illustrating a relationship between the delivery pressure of a pump for emulsion fuel and the pressure held by the constant-pressure valve.

The relationship between the delivery pressure of the emulsion fuel and the fixed pressure Po kept by the constant-pressure valve 31 described above is illustrated in FIG. 3. Such effects as described below are provided by employment of the constant-pressure valve 31 described above. In particular, since the delivery pressure of the pump 48 becomes higher than the pressure of the fuel in the injection pipe IP in a period of time before pressure feeding of diesel fuel is started again after completion of preceding pressure feeding of diesel fuel by the injection pipe 22, the emulsion fuel is introduced into the injection pipe IP. In this instance, since, in the present embodiment, the emulsion fuel is not drawn into the injection pipe IP by a negative pressure caused by a drawing back action as in the prior art apparatus disclosed in U.S. Pat. No. 3,933,132 but introduced into the injection pipe IP by a pressure difference on the positive pressure side, cavitations (air bubbles), which are liable to be produced in fuel by a negative pressure drawing in action, are not produced. As a result, prevention of cavitation erosion is achieved.

Description will next be made of an illustrative operation of the emulsion fuel engine of the first embodiment constructed as described above. When it is desired to operate the engine as a diesel engine with diesel fuel alone, the pump 44, the fuel pump 48 and the mixer 45 are left stopped. In this case, the plunger 27 reciprocates up and down following rotation of the cam 26 rotating together with the cam shaft 25, whereby the injection pump 22 begins to draw the fuel after the upper end face of the plunger 27 has come to a position lower than the fuel draw/spill port 29, begins to deliver the fuel under pressure after the upper end face of the plunger 27 has moved to a position above the fuel draw/spill port 29, and then terminates the delivery of the fuel under pressure to the injection pump 22 when the lead 30 formed in a peripheral wall of the plunger 27 has overlapped the fuel draw/spill port 29. Since the fuel pump 48 is not operated, no emulsion fuel is allowed to enter the injection pipe IP.

The diesel fuel, which has been delivered under pressure from the injection pipe 22 via the injection pipe IP, is hence injected into the combustion chamber through the injection nozzle 32, so that the engine is operated with the diesel fuel.

On the other hand, when it is desired to operate the engine as an emulsion engine with an emulsion fuel, the fuel pump 23 is operated, and at the same time, the pump 44, the fuel pump 48 and the mixer 45 are operated.

Consequently, the diesel fuel and the water are drawn by the pump 44 and then mixed in the mixer 45, and the resulting emulsion fuel is delivered to the emulsion fuel tank 46. The emulsion fuel stored in the emulsion fuel tank 46 is then delivered under pressure toward the junction 49 by the fuel pump 48.

Since the pressure of the emulsion fuel in the fuel pipe 47 becomes higher than the pressure of the fuel in the injection pipe IP during the period after the completion of delivery of diesel fuel under pressure by the injection pump 22 until the initiation of the next delivery of the same under pressure, the check valve 50 is opened during this period so that the emulsion fuel enters the injection pipe IP through the check valve 50.

As the emulsion fuel enters the injection pipe IP through the check valve 50 after the completion of the delivery of the diesel fuel under pressure by the injection pump 22 until the initiation of the next delivery of the same under pressure, several injections are then performed subsequent to the change-over to the emulsion fuel, resulting in the penetration of the emulsion fuel to a position of the injection pipe IP indicated by slanting lines in FIG. 1.

The emulsion fuel is then delivered forward under pressure by the diesel fuel fed under pressure from the injection pump 22, whereby the emulsion fuel is injected through the injection nozzle 32 to operate the engine as an emulsion engine with the emulsion fuel.

The boundary A between the diesel fuel and the emulsion fuel within the injection pipe IP moves in the direction indicated by arrow whenever each injection is completed. The boundary, however, returns approximately to the original position before the next delivery of the diesel fuel under pressure by the injection pump 22 is initiated, because the emulsion fuel enters the injection pipe IP through the check valve 50 after the completion of the delivery of the diesel fuel under pressure by the injection pump 22 until the initiation of the next delivery of the diesel fuel under pressure.

As has been described above, when the engine is operated using an emulsion fuel, the emulsion fuel does not flow through the injection pump unlike the conventional apparatus described hereinabove. The emulsion fuel engine according to the present invention is therefore absolutely free of the problem that the durability of the injection pump 22 is reduced by excess wear due to insufficient lubrication and rusting.

Further, water and diesel fuel are mixed for the first time when the engine is operated by an emulsion fuel. The emulsion fuel engine according to the present invention is also free of the problem that, when the emulsion fuel is left over for a long time, the emulsion fuel separates into diesel fuel and water, water is hence injected at a start, and a starting failure thus takes place due to poor ignitability.

Further, in the embodiment described above, since water is mixed with fuel first and then the mixture is introduced into the injection pipe so that the water and the fuel in a sufficiently mixed condition are injected into the combustion chamber, the water and the fuel are spread uniformly in the combustion chamber, and since the water is present in the lighted fuel, the influence of the water upon combustion is exhibited sufficiently and a sufficient effect of reduction of NOx by the drop of the combustion temperature is achieved sufficiently. Furthermore, the water injected into the combustion chamber together with the fuel forms atomization in which it encloses the air therein, which contributes to improvement of the combustion of fuel and achieves reduction of soot and reduction of the specific fuel consumption.

Figure 4:
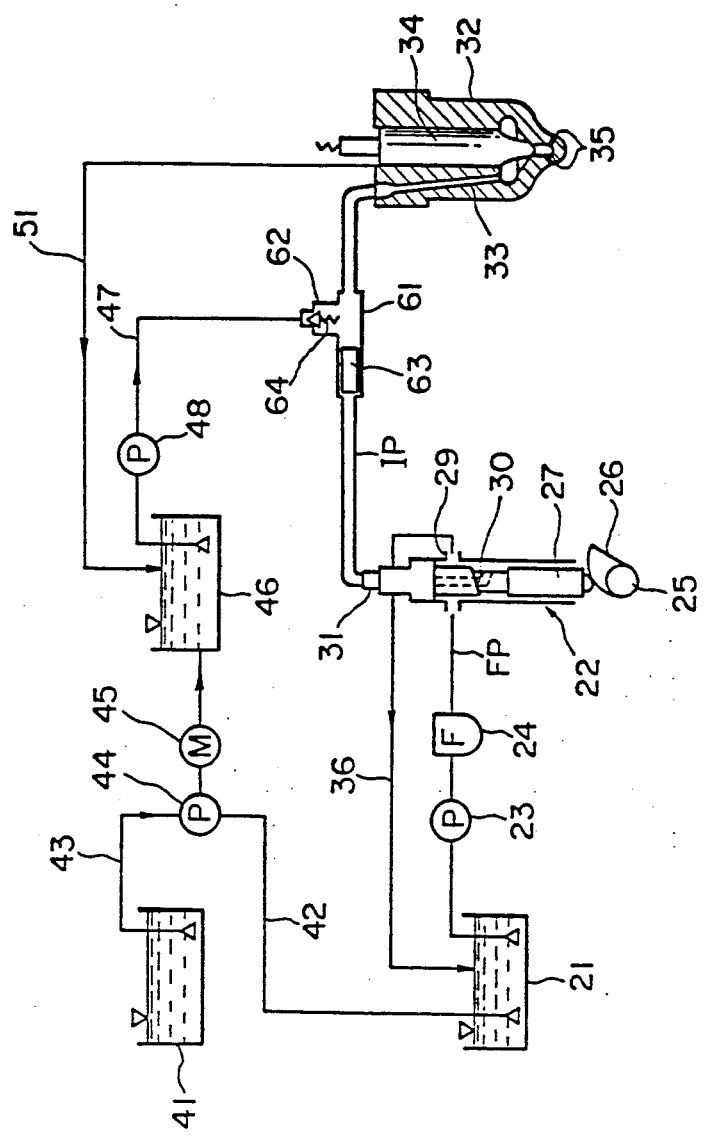
FIG. 4 is a block diagram of an emulsion fuel engine according to a second embodiment of the present invention.

Referring now to FIG. 4, there is shown an emulsion fuel engine according to a second preferred embodiment of the present invention. The emulsion fuel engine includes a first fuel tank 21 in which diesel fuel as a first fuel is stored, an injection pump 22, and a fuel pipe FP arranged between the first fuel tank 21 and the injection pump 22 and provided with a fuel pump 23 for delivering the fuel and also with a fuel filter 24. The fuel pump 22 is provided with a plunger 27 which reciprocates up and down as a camshaft 25 rotates together with a cam 26. The injection pump 22 begins to draw the fuel after an upper end face of the plunger 27 has come to a position lower than a fuel draw/spill port 29. After the upper end face of the plunger 27 has moved to a position above the fuel draw/spill port 29, the injection pump 22 begins to deliver the fuel under pressure. When a lead 30 formed in a peripheral wall of the plunger 27 has overlapped the fuel draw/spill port 29, the injection pump 22 terminates the delivery of the fuel under pressure.

An injection pipe IP is arranged between a top portion of the injection pump 22 (which has such a constant-pressure valve 31 having a bidirectional check valve mechanism as shown in FIG. 2 provided at an upper portion thereof) and an injection nozzle 32.

The fuel which has been delivered under pressure from the injection pipe IP is introduced to a lower part of the nozzle 32 through a fuel feed channel 33 in the injection nozzle 32. A needle valve 34 is lifted by the pressure of the fuel, whereby the fuel is injected into a combustion chamber through injector holes 35 while the fuel discharged from the injection pipe 22 is returned to the fuel tank 21 via a fuel return pipe 36.

Pipings 42, 43 with distal ends thereof extending to bottom parts of the first tank 21 and the second fuel tank 41 in which water is stored, respectively, are connected at proximal ends thereof to suction ports of a pump 44, respectively. Via a mixer 45 where diesel fuel and water are agitated and emulsified into an emulsion fuel, a delivery port of the pump 44 is connected to an emulsion fuel tank 46 in which the emulsion fuel is stored.

A fuel pipe 47 one end of which is located in a bottom part of the emulsion fuel tank 46 is provided with a fuel pump 48, and the other end of the fuel pipe 47 is connected to a cylinder chamber 61 at a junction 62.

A free piston 63 is fitted in the cylinder chamber 61. A check valve 64 is provided at the junction 62 so that, when the pressure of the emulsion fuel in the fuel pipe 47 becomes higher than the pressure of the fuel in the cylinder chamber 61, it allows admission of the emulsion fuel into a right chamber of the cylinder chamber.

Further, the fuel discharged from the injection pipe 32 is returned to the emulsion fuel tank 46 via a fuel return pipe 51.

Description will next be made of an illustrative operation of the emulsion fuel engine of the second embodiment constructed as described above. When it is desired to operate the engine as an emulsion engine with an emulsion fuel, the fuel pump 23 is operated, and at the same time, the pump 44, the fuel pump 48 and the mixer 45 are operated.

Consequently, the diesel fuel and the water are drawn by the pump 44 and then mixed in the mixer 45, and the resulting emulsion fuel is delivered to the emulsion fuel tank 46. The emulsion fuel stored in the emulsion furl tank 46 is then fed under pressure toward the junction 62 by the fuel pump 48.

Since the pressure of the emulsion fuel in the fuel pipe 47 becomes higher than the pressure of the fuel in the injection pipe IP during the period after the completion of delivery of diesel fuel under pressure by the injection pump 22 until the initiation of the next delivery of the same under pressure, the check valve 64 is opened during this period so that the emulsion fuel enters the injection pipe IP through the check valve 64. Consequently, the free piston 63 is moved leftwardly by the pressure of the emulsion fuel admitted into the cylinder chamber 61 to its leftmost position at which it is contacted with and stopped by the end of the cylinder chamber 61. As a result, the emulsion fuel is prevented from flowing farther than the cylinder chamber 61 into the injection pipe IP on the injection pump 22 side.

Then, the pressure of the diesel fuel fed under pressure from the injection pump 22 acts upon the left end face of the free piston 63, and the emulsion fuel is pressure fed by the pressure produced at the right end face of the free piston 63 so that the emulsion fuel is injected from the injection nozzle 32, whereby the diesel engine is operated with the emulsion fuel.

Figure 5:
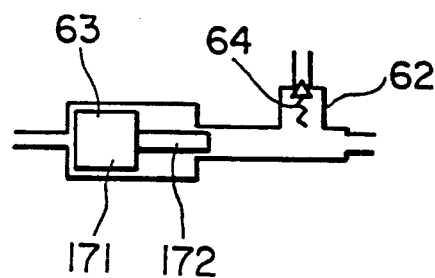
FIG. 5 is a schematic view showing a modified free piston.

The free piston 63 may have such a profile as shown in FIG. 5 wherein it has a large diameter portion 171 adjacent the injection pump 22 while it has a smaller diameter portion 172 adjacent the injection nozzle 32 so that the pressure of the diesel oil it receives at the large diameter portion 172 thereof may be transmitted in a boosted condition to the emulsion fuel. The construction can achieve increase of the injected amount of emulsion as well as further reduction of the exhaust gas and the specific fuel consumption.

The diesel engine of the present embodiment described above achieves substantially similar effects to the diesel engine of the first embodiment described hereinabove. In addition, with the diesel engine of the present embodiment, since, when the diesel engine is operated using an emulsion fuel, the movement of the emulsion fuel to the injection pump 22 side is prevented by the free piston 63, the emulsion fuel will not pass through the fuel injection pump 22 at all. Consequently, the diesel engine of the present invention is absolutely free of the problem that the durability of the injection pump 22 is reduced by excess wear due to insufficient lubrication and rusting.

Figure 6:
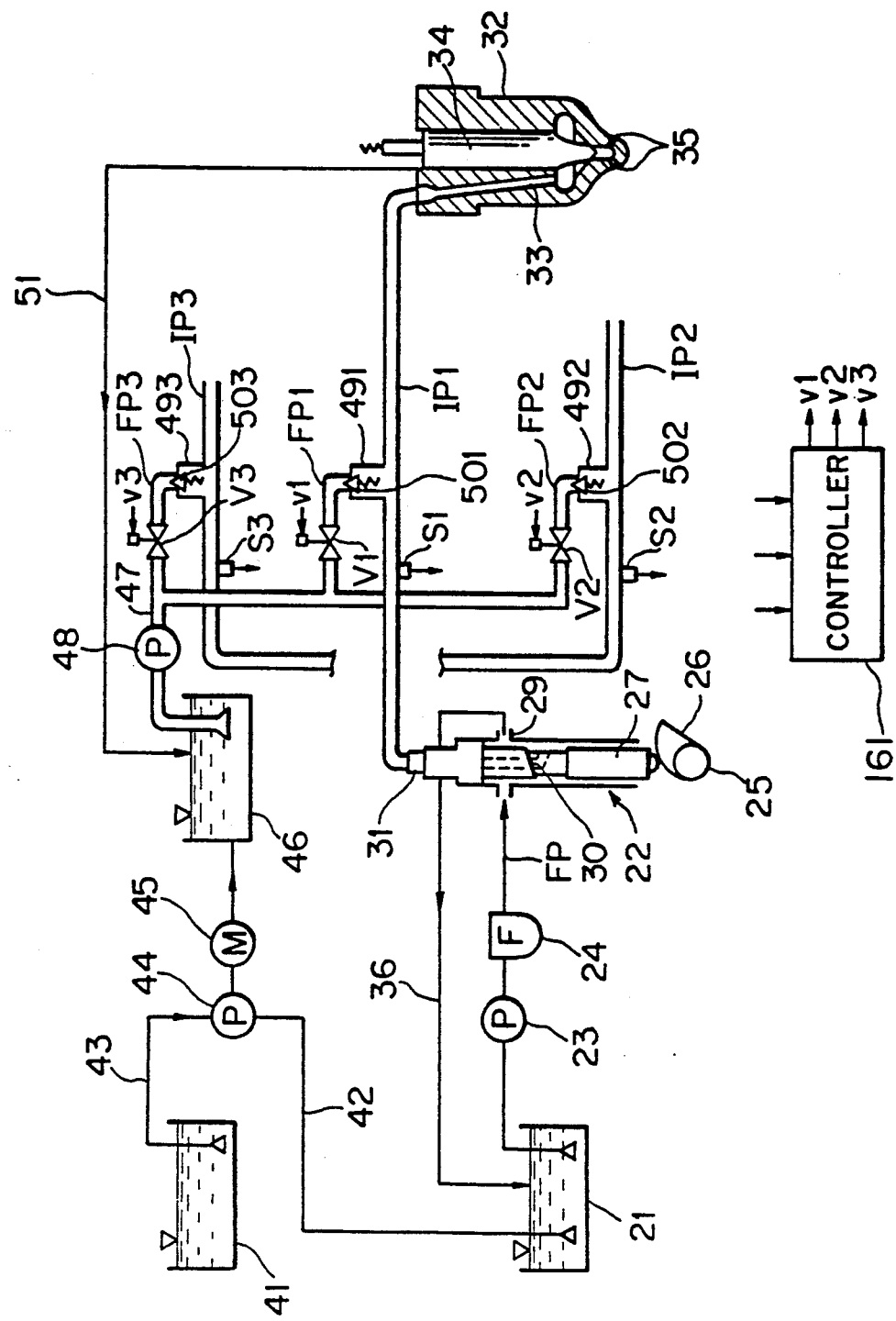
FIG. 6 is a block diagram of an emulsion fuel engine according to a third embodiment of the present invention.

Referring now to FIG. 6, there is shown an emulsion fuel engine according to a third preferred embodiment of the present invention. The emulsion fuel engine of the present embodiment is formed as a four-cylinder diesel engine in which fuel is injected using an in-line pump. In FIG. 6, the injection systems are shown for the first to third cylinders while the injection system for the fourth cylinder is omitted.

The diesel engine of the present embodiment includes a first fuel tank 21 in which diesel fuel as a first fuel is stored, an injection pump 22 of an in-line injection pump having a plurality of such injection pumps, and a fuel pipe FP arranged between the first fuel tank 21 and the injection pump 22 and provided with a fuel pump 23 for delivering the fuel and also with a fuel filter 24. The fuel pump 22 is provided with a plunger 27 which reciprocates up and down as a cam shaft 25 rotates together with a cam 26. The injection pump 22 begins to draw the fuel after an upper end face of the plunger 27 has come to a position lower than a fuel draw/spill port 29. After the upper end face of the plunger 27 has moved to a position above the fuel draw/spill port 29, the injection pump 22 begins to deliver the fuel under pressure. When a lead 30 formed in a peripheral wall of the plunger 27 has overlapped the fuel draw/spill port 29, the injection pump 22 terminates the delivery of the fuel under pressure.

An injection pipe IP1 is arranged between a top portion of the injection pump 22 (which has such a constant-pressure valve 31 having a bidirectional check valve mechanism as shown in FIG. 2 provided at an upper portion thereof) and an injection nozzle 32 of the first cylinder. Meanwhile, an injection pipe IP2 is arranged between another injection pump and the injection nozzle (not shown) of the second cylinder, and another injection pipe IP3 is arranged between a further injection pump and the injection nozzle (not shown) of the third cylinder.

A fuel feed channel 33 is perforated in the injection nozzle 32, and the fuel which has been delivered under pressure from the corresponding injection pipe is introduced to a lower part of the nozzle 32 through the fuel feed channel 33. A needle valve 34 is lifted by the pressure of the fuel, whereby the fuel is injected into a combustion chamber through injector holes 35 while the fuel discharged from the injection pipe 22 is returned to the fuel tank 21 via a fuel return pipe 36.

Pipings 42, 43 with distal ends thereof extending to bottom parts of the first fuel tank 21 and the second fuel tank 41 in which water is stored, respectively, are connected at proximal ends thereof to suction ports of a pump 44, respectively. Via a mixer 45 where diesel fuel and water are agitated and emulsified into an emulsion fuel, a delivery port of the pump 44 is connected to an emulsion fuel tank 46 in which the emulsion fuel is stored.

A fuel pipe 47 one end of which is located in a bottom part of the emulsion fuel tank 46 is provided with a fuel pump 48, and the other end of the fuel pipe 47 is branched into fuel pipes FP1 to FP3, which are connected to injection pipes IP1 to IP3 at junction 491 to 493, respectively. Check valves 501 to 503 are provided at the junctions 491 to 493, respectively, so that, when the pressure of the emulsion fuel in the fuel pipe 47 becomes higher than the pressure of the fuel in any one of the injection pipes IP1 to IP3, it allows admission of the emulsion fuel into the corresponding injection pipe IP1, IP2 or IP3.

The fuel pipes FP1 to FP3 are provided with solenoid opening/closing valves V1 to V3 for on/off controlling the supply of emulsion fuel, respectively. The opening and closing operations of the solenoid opening/closing valves V1 to V3 are controlled in accordance with control signals v1 to v3 from a controller 161, respectively.

Position sensors S1 to S3 are provided at locations adjacent the injection pipe 22 spaced by a predetermined distance from the junctions 491 to 493 of the injection pipes IP1 to IP3, respectively. Detection signals of the position sensors S1 to S3 are inputted to the controller 161.

Figure 7A:
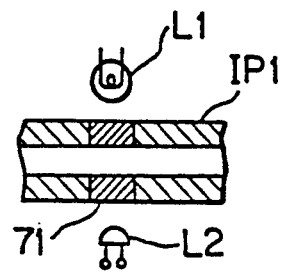
FIGS. 7(A) to 7(D) are schematic views showing different position sensors.

Such a sensor as shown in FIG. 7(A) may be employed for the position sensors S1 to S3.

In particular, refer to FIG. 7(A), the sensor shown is a position sensor of the transmission type and includes a light emitting element L1 and a light receiving element L2 arranged, for example, on the opposite sides of the injection pipe IP1. The portion of the injection pipe IP1 indicated by slanting lines is formed as a light transmitting portion 71 so that, when diesel fuel is in the light transmitting portion 71, since the diesel fuel is yellowish brown and transparent, light from the light emitting element L1 is transmitted through the light transmitting portion 71 and received by the light receiving element L2. On the other hand, when emulsion fuel is in the light transmitting portion 71, since the emulsion fuel is milk-white and opaque and hence does not transmit light therethrough, light from the light emitting element L1 is intercepted by the emulsion fuel in the light transmitting portion 71 and is not received by the light receiving element L2. The position sensors S1 to S3 output such detection signals to the controller 161.

Further, the fuel discharged from the injection pipe 32 is returned to the emulsion fuel tank 46 via a fuel return pipe 51.

Description will next be made of an illustrative operation of the emulsion fuel engine of the third embodiment constructed as described above. When it is desired to operate the engine as a diesel engine with diesel fuel alone, the pump 44, the fuel pump 48 and the mixer 45 are left stopped. In this case, the plunger 27 reciprocates up and down following rotation of the cam 26 rotating together with the cam shaft 25, whereby the injection pump 22 begins to draw the fuel after the upper end face of the plunger 27 has come to a position lower than the fuel draw/spill port 29, begins to deliver the fuel under pressure after the upper end face of the plunger 27 has moved to a position above the fuel draw/spill port 29, and then terminates the delivery of the fuel under pressure to the injection pump 22 when the lead 30 formed in a peripheral wall of the plunger 27 has overlapped the fuel draw/spill port 29. Since the fuel pump 47 is not operated, no emulsion fuel is allowed to enter the injection pipes IP1 to IP3.

The diesel fuel, which has been delivered under pressure from the injection pipe 22 via any of the injection pipes IP1 to IP3, is hence injected into the combustion chamber through the injection nozzle 32 or any other corresponding injection nozzle, so that the diesel engine is operated with the diesel fuel.

On the other hand, when it is desired to operate the engine as an emulsion engine with an emulsion fuel, the fuel pump 23 is operated, and at the same time, the pump 44, the fuel pump 44 and the mixer 45 are operated.

Consequently, the diesel fuel and the water are drawn by the pump 44 and then mixed in the mixer 45, and the resulting emulsion fuel is delivered to the emulsion fuel tank 46. The emulsion fuel stored in the emulsion fuel tank 46 is then delivered under pressure toward the junctions 491 to 493 by the fuel pump 48.

Since any of the solenoid opening/closing valves V1 to V3 is controlled to open so that pressure of the emulsion fuel in the fuel pipe 47 becomes higher than the pressure of the fuel in a corresponding one of the injection pipes IP1 to IP3 during the period after the completion of delivery of diesel fuel under pressure by the injection pump 22 until the initiation of the next delivery of the same under pressure, the check valve 50 is opened during this period so that the emulsion fuel enters the injection pipe IP1, IP2 or IP3 through the check valve 50.

Meanwhile, each of the sensors S1 to S3 detects that the emulsion fuel has come to the position thereof, but when no emulsion fuel has come to any one of the sensors S1 to S3, one of the solenoid opening/closing valves V1 to V3 corresponding to the sensor is controlled to open. Accordingly, the boundary between emulsion fuel and diesel fuel in each of the injection pipes IP1 to IP3 is controlled for each cylinder so that it may be positioned at the location of a corresponding one of the position sensors S1 to S3.

The emulsion fuel is then delivered forward under pressure by the diesel fuel fed under pressure from the injection pump 22, whereby the emulsion fuel is injected through the injection nozzle 32 to operate the engine as an emulsion engine with the emulsion fuel.

The diesel engine of the present embodiment achieves substantially similar effects to the diesel engine of the first embodiment described hereinabove.

In addition, the boundary between diesel fuel and emulsion fuel in each of the injection pipes IP1 to IP3 can be maintained fixed.

Figure 7B:
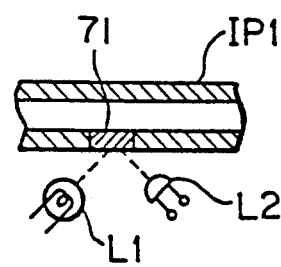
Figure 7C:
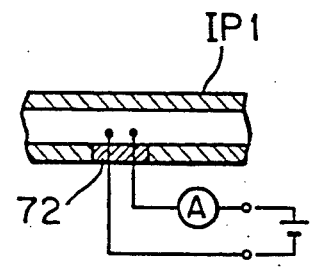
Figure 7D:
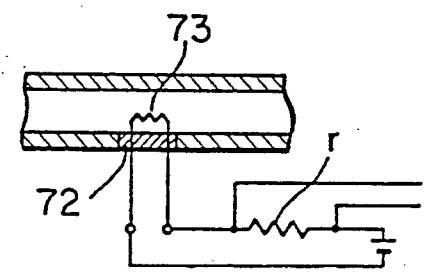

It is to be noted that, while the position sensor shown in FIG. 7(A) is employed for the position sensors S1 to S3 of the diesel engine of the embodiment described above, a sensor of the reflecting type shown in FIG. 7(B), an electric resistance sensor shown in FIG. 7(C) or a heat ray sensor shown in FIG. 7(D) may be employed in place of the position sensor shown in FIG. 7(A).

In short, the sensor shown in FIG. 7(B) makes use of the fact that diesel fuel is yellowish brown and hardly reflects light while emulsion fuel is milk-white and reflects light with a high degree. The portion 71 of the injection pipe IP1 is thus formed from a light transmitting material, and it is detected whether or not light emitted from the light emitting element L1 of the sensor is received by the light receiving element L2 of the sensor.

Meanwhile, the sensor shown in FIG. 7(C) makes use of the fact that emulsion fuel is lower in resistance value than diesel fuel. A portion 72 of the injection pipe IP1 is formed from an insulating material, and a pair of electrodes extend into the inside of the injection pipe IP1 through the insulating material portion 72. A high voltage is applied between the electrodes and a current flowing between the electrodes is measured to detect a resistance value.

On the other hand, the sensor shown in FIG. 7(D) makes use of the fact that emulsion fuel is higher in thermal conductivity than diesel fuel. A portion 72 of the injection pipe IP1 is formed from an insulating material, and a heating coil 73 is inserted in the inside of the injection pipe IP1 through the insulating material portion 72. A fixed voltage is applied between the opposite ends of the heating coil 73 and a current flowing through a resistor r connected in series to the heating coil 73 is measured. Since emulsion fuel cools the heating coil 73 to a higher degree than diesel fuel, the heating coil 73 is cooled to a lower temperature in emulsion fuel, and consequently, it exhibits a lower electric resistance and a higher current flows therethrough.

Figure 8:
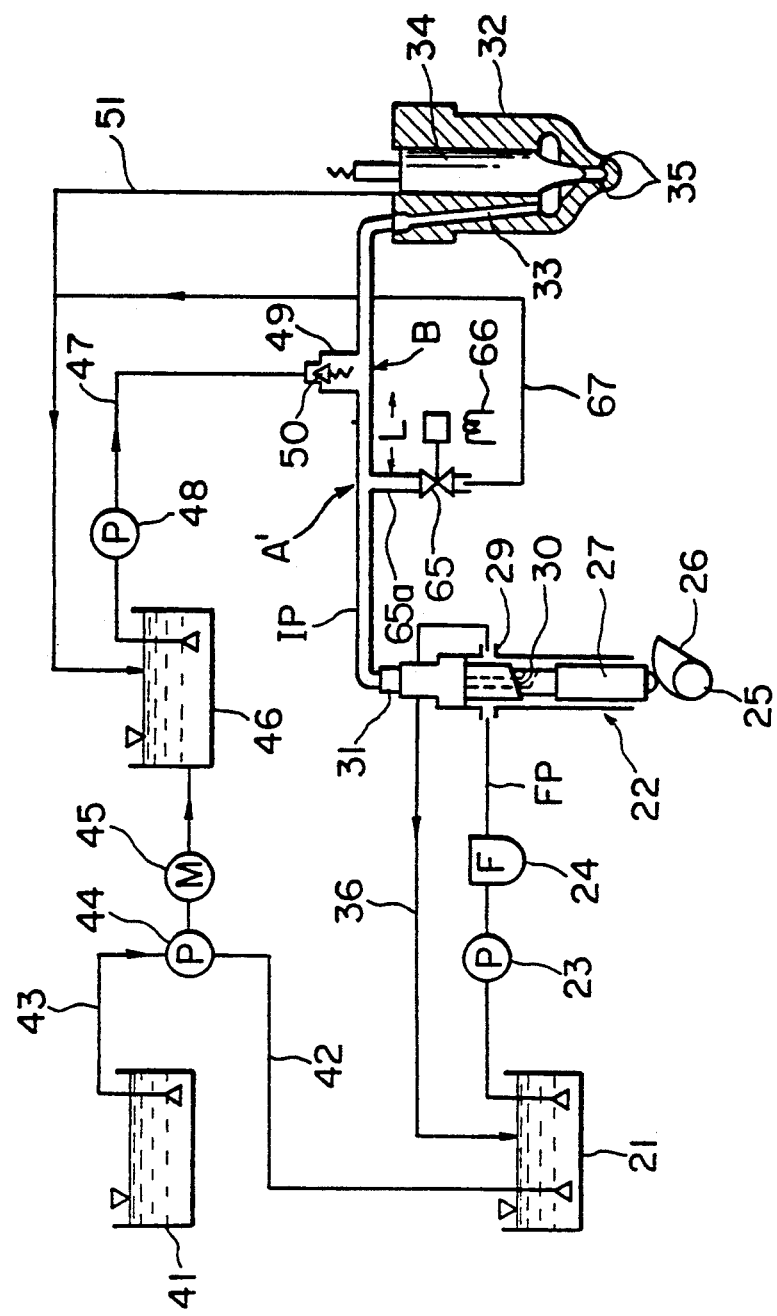
FIG. 8 is a block diagram of an emulsion fuel engine according to a fourth embodiment of the present invention.

Referring now to FIG. 8, there is shown an emulsion fuel engine according to a fourth preferred embodiment of the present invention. The emulsion fuel engine includes a first fuel tank 21 in which diesel fuel as a first fuel is stored, an injection pump 22, and a fuel pipe FP arranged between the first fuel tank 21 and the injection pump 22 and provided with a fuel pump 23 for delivering the fuel and also with a fuel filter 24. The fuel pump 22 is provided with a plunger 27 which reciprocates up and down as a cam shaft 25 rotates together with a cam 26. The injection pump 22 begins to draw the fuel after an upper end face of the plunger 27 has come to a position lower than a fuel draw/spill port 29. After the upper end face of the plunger 27 has moved to a position above the fuel draw/spill port 29, the injection pump 22 begins to deliver the fuel under pressure. When a lead 30 formed in a peripheral wall of the plunger 27 has overlapped the fuel draw/spill port 29, the injection pump 22 terminates the delivery of the fuel under pressure.

An injection pipe IP is arranged between a top portion of the injection pump 22 (which has such a constant-pressure valve 31 having a bidirectional check valve mechanism as shown in FIG. 2 provided at an upper portion thereof) and an injection nozzle 32.

The fuel which has been delivered under pressure from the injection pipe IP is introduced to a lower part of the nozzle 32 through a fuel feed channel 33 perforated in the injection nozzle 32. A needle valve 34 is lifted by the pressure of the fuel, whereby the fuel is injected into a combustion chamber through injector holes 35 while the fuel discharged from the injection pipe 22 is returned to the fuel tank 21 via a fuel return pipe 36.

Pipings 42, 43 with distal ends thereof extending to bottom parts of the first fuel tank 21 and the second fuel tank 41, respectively, are connected at proximal ends thereof to suction ports of a pump 44, respectively. Via a mixer 45 where diesel fuel and water are agitated and emulsified into an emulsion fuel, a delivery port of the pump 44 is connected to an emulsion fuel tank 46 in which the emulsion fuel is stored.

A fuel pipe 47 one end of which is located in a bottom part of the emulsion fuel tank 46 is provided with a fuel pump 48, and the other end of the fuel pipe 47 is connected to an injection pipe IP at a junction 49 (position B). A check valve 50 is provided at the junction 49 so that, when the pressure of emulsion fuel in the fuel pipe 47 becomes higher than the pressure of fuel in the injection pipe IP, it allows admission of the emulsion fuel into the injection pipe IP.

A solenoid spill valve 65 is attached to a pipe 65a one end of which is connected at a position A' to the injection pipe IP spaced by a preset distance L from the junction 49 on the injection pump 22 side. The solenoid spill valve 65 is operated by a solenoid coil 66. The other end of the solenoid spill valve 65 is connected to the emulsion fuel tank 46 by way of a fuel return pipe 67. Here, where the inner diameter of the injection pipe IP is represented by d (mm) and the injection amount is represented by q (mm³), the distance L is set to $L \geq 4q/\pi d^2$ so that, even immediately after emulsion fuel has been injected to the maximum, the end of the diesel fuel which acts to push out the emulsion fuel may not move farther than the position B to the injection nozzle 32 side.

Further, the fuel discharged from the injection pipe 32 is returned to the emulsion fuel tank 46 via a fuel return pipe 51.

Description will next be made of an illustrative operation of the emulsion fuel engine of the fourth embodiment constructed as described above. When it is desired to operate the engine as a diesel engine with diesel fuel alone, the pump 44, the fuel pump 48 and the mixer 45 are left stopped. In this case, the plunger 27 reciprocates up and down following rotation of the cam 26 rotating together with the cam shaft 25, whereby the injection pump 22 begins to draw the fuel after the upper end face of the plunger 27 has come to a position lower than the fuel draw/spill port 29, begins to deliver the fuel under pressure after the upper end face of the plunger 27 has moved to a position above the fuel draw/spill port 29, and then terminates the delivery of the fuel under pressure to the injection pump 22 when the lead 30 formed in a peripheral wall of the plunger 27 has overlapped the fuel draw/spill port 29. Since the fuel pump 48 is not operated, no emulsion fuel is allowed to enter the injection pipe IP.

The diesel fuel, which has been delivered under pressure from the injection pipe 22 via the injection pipe IP, is hence injected into the combustion chamber through the injection nozzle, so that the engine is operated with the diesel fuel.

Figure 9:
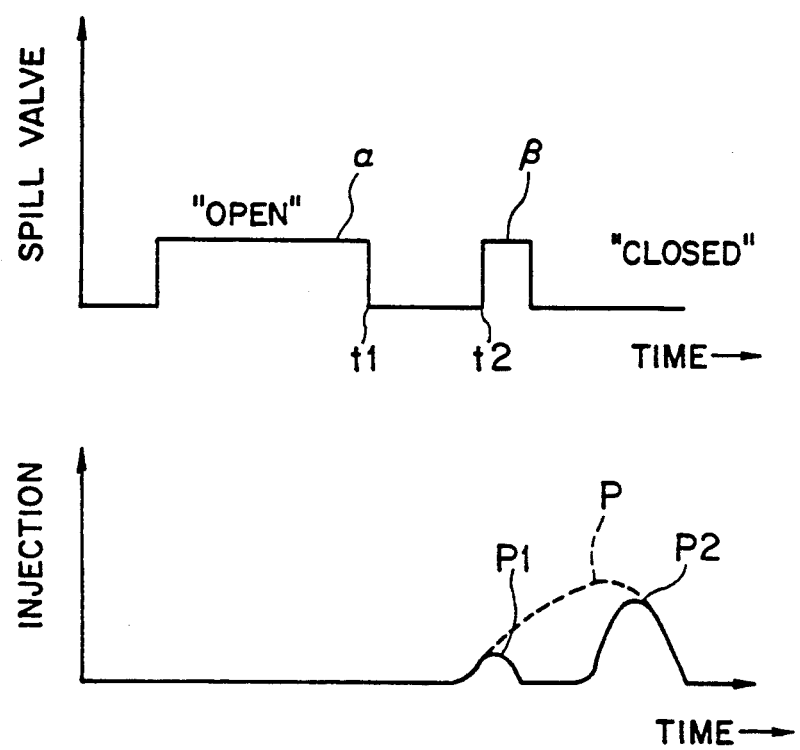
FIG. 9 is a diagram showing a relationship between the opening and closing movement of a solenoid spill valve and the injection.
Figure 10:
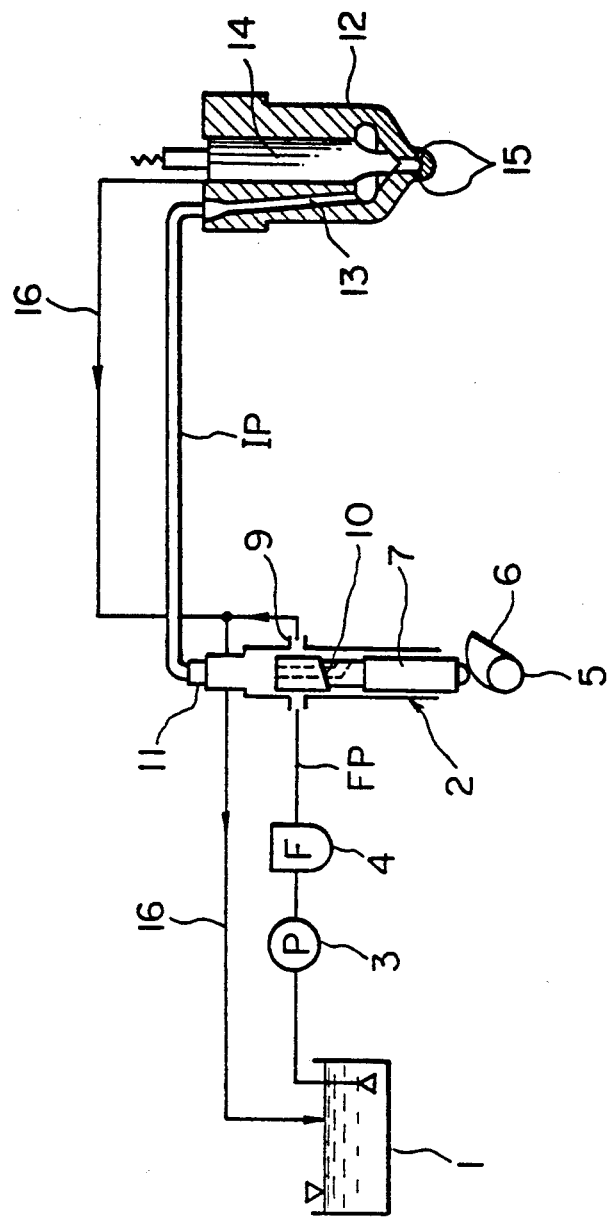
FIG. 10 is a block diagram of a conventional emulsion fuel engine.

On the other hand, when it is desired to operate the engine as an emulsion engine with an emulsion fuel, the fuel pump 23 is operated, and at the same time, the pump 44, the fuel pump 44 and the mixer 45 are operated. Further, the solenoid spill valve 65 is controlled to open and close at such timings as shown in FIG. 9.

Consequently, the diesel fuel and the water are drawn by the pump 44 and then mixed in the mixer 45, and the resulting emulsion fuel is delivered to the emulsion fuel tank 46. The emulsion fuel stored in the emulsion fuel tank 46 is then delivered under pressure toward the junction 49 by the fuel pump 48.

Since the solenoid spill valve 65 is opened for a suitable period $\alpha$ between each two successive injecting cycles and the pressure of the emulsion fuel in the fuel pipe 47 becomes higher than the pressure of the fuel in the injection pipe IP during the period, the check valve 50 is opened during this period so that the emulsion fuel enters the injection pipe IP through the check valve 50 until the positions A' and B are filled with the emulsion fuel. Then, the solenoid spill valve 65 is closed at the time t1. Consequently, the emulsion fuel is fed under pressure by the diesel fuel fed under pressure from the injection pump 22 so that it is injected from the injection nozzle 32 thereby to operate the diesel engine with the emulsion fuel.

Further at the time t2 during injection, the solenoid spill valve 65 is opened again for a period $\beta$ ($<\alpha$). Consequently, the emulsion fuel in the injection pipe IP is returned to the emulsion fuel tank 46 by way of the solenoid spill valve 65 and the injection of the emulsion fuel is interrupted momentarily. In other words, as seen from FIG. 9, the injection cycle is divided into a pilot injection period P1 and a main injection period P2 in which the diesel engine is operated by the emulsion fuel. It is to be noted that, otherwise if the injection cycle is not divided into the pilot injection period P1 and the main injection period P2, then the injection in the injection cycle will be such as indicated by a broken line curve P in FIG. 9.

Since pilot injection and main injection are performed separately in this manner, combustion noise which arises from use of an emulsion fuel can be further reduced.

Further, the diesel engine of the present embodiment achieves substantially similar effects to the diesel engine of the first embodiment described hereinabove.

What is claimed is:

1. An emulsion fuel internal combustion engine, comprising:
 a fuel injection pump for supplying a first fuel to a fuel injection nozzle;
 an injection pipe communicating said fuel injection pump and said fuel injection nozzle; and
 emulsion fuel supplying means for supplying an emulsion fuel, which is obtained by emulsifying a portion of the first fuel and a second fuel which is insoluble in the first fuel, to said injection pipe between said fuel injection pump and said fuel injection nozzle.

2. An emulsion fuel engine as claimed in claim 1, wherein the first fuel is diesel fuel and the second fuel is water.

3. An emulsion fuel engine as claimed in claim 1, wherein the first fuel is diesel fuel and the second fuel is methanol.

4. An emulsion fuel engine as claimed in claim 2, wherein the first fuel is diesel fuel and the second fuel is water.

5. An emulsion fuel engine as claimed in claim 2, wherein the first fuel is diesel fuel and the second fuel is methanol.

6. An emulsion fuel internal combustion engine, comprising: a first fuel tank for storing a first fuel therein; a second fuel tank for storing a second fuel therein;
- an injection nozzle provided for injecting fuel into combustion cylinder;
- an injection pump communicated with said first fuel tank for feeding first fuel from said first fuel tank under pressure toward said injection nozzle at a predetermined timing;
- mixing means for mixing a portion of the first fuel from said first fuel tank and the second fuel from said second fuel tank to form an emulsion fuel;
- an injection pipe communicating said injection pump and said injection nozzle; and
- emulsion fuel supplying means for supplying the emulsion fuel from said mixing means to said injection pipe between said injection pump and said injection nozzle by way of a check valve.

7. An emulsion fuel engine as claimed in claim 2, wherein said emulsion fuel supplying means includes a pump for feeding the emulsion fuel under pressure to said injection pipe.

8. An emulsion fuel internal combustion engine comprising:
- a first fuel tank for storing a first fuel therein;
- a second fuel tank for storing a second fuel therein;
- an injection nozzle provided for injecting fuel into combustion cylinder;
- an injection pump communicated with said first fuel tank for feeding the first fuel from said first fuel tank under pressure toward said injection nozzle at a predetermined timing;
- mixing means for mixing the first fuel from said first fuel tank and the second fuel from said second fuel tank to form an emulsion fuel;
- emulsion fuel supplying means for supplying the emulsion fuel from said mixing means to an injection pipe between said injection pump and said injection nozzle by way of a check valve; and
- a free piston disposed in said injection pipe adjacent said injection pump with respect to a position at which the emulsion fuel is supplied to said injection pipe for preventing the emulsion fuel supplied to said injection pipe from moving to said injection pump side.

9. An emulsion fuel engine as claimed in claim 8, wherein said free piston has a large diameter portion adjacent said injection pump and a small diameter portion adjacent said injection nozzle and transmits the pressure of the diesel fuel from said injection pump received at said large diameter portion thereof in a boosted condition to the emulsion fuel.

10. An emulsion fuel internal combustion engine comprising:
- a first fuel tank for storing a first fuel therein;
- a second fuel tank for storing a second fuel therein;
- an injection nozzle provided for injecting fuel into a combustion cylinder;
- an injection pump communicated with said first fuel tank for feeding the first fuel from said first fuel tank under pressure toward said injection nozzle at a predetermined timing;
- mixing means for mixing the first fuel from said first fuel tank and the second fuel from said second fuel tank to form an emulsion fuel;
- emulsion fuel supplying means for supplying the emulsion fuel from said mixing means to an injection pipe between said injection pump and said injection nozzle by way of a check valve;
- a solenoid valve interposed in an emulsion fuel pipe which is provided to supply the emulsion fuel to said injection pipe, and operated for opening and closing movement;
- a position sensor arranged on said injection pipe adjacent said injection pump with respect to a position at which the emulsion fuel is supplied to said injection pipe for detecting the position of the emulsion fuel supplied to said injection pipe; and
- position controlling means for controlling said solenoid valve to open until the emulsion fuel is detected by said position sensor.

11. An emulsion fuel internal combustion engine comprising:
- a first fuel tank for storing a first fuel therein;
- a second fuel tank for storing a second fuel therein;
- an injection nozzle provided for injecting fuel into a combustion cylinder;
- an injection pump communicated with said first fuel tank for feeding the first fuel from said first fuel tank under pressure toward said injection nozzle at a predetermined timing;
- mixing means for mixing the first fuel from said first fuel tank and the second fuel from said second fuel tank to form an emulsion fuel;
- emulsion fuel supplying means for supplying the emulsion fuel from said mixing means to an injection pipe between said injection pump and said injection nozzle by way of a check valve;
- a branch pipe connected to said injection pipe adjacent said injection pump with respect to a position at which the emulsion fuel is supplied to said injection pipe;
- a solenoid spill valve interposed in said branch pipe; and
- solenoid spill valve controlling means for controlling opening and closing movement of said solenoid spill valve to discharge the first fuel or the emulsion fuel in said injection pipe.

12. An emulsion fuel engine as claimed in claim 11, wherein the distance L (mm) from the position at which the emulsion fuel is supplied to said injection pipe to said branch pipe is set to $L \geq 4 \, d/\pi d^2$ where d is the inner diameter (mm) of said injection pipe and q is the amount (mm$^3$) of the emulsion fuel injected for each injection cycle.

13. An emulsion fuel engine as claimed in claim 11, wherein said solenoid spill valve controlling means controls said solenoid spill valve to open for a predetermined period of each injection cycle to separate the injection cycle into a period of pilot injection and another period of main injection.

14. An emulsion fuel internal combustion engine comprising:
   a first fuel tank for storing a first fuel therein;
   a second fuel tank for storing a second fuel therein;
   an injection nozzle provided for injecting fuel into a combustion cylinder;
   an injection pump communicated with said first fuel tank for feeding the first fuel from said first fuel tank under pressure toward said injection nozzle at a predetermined timing;
   mixing means for mixing the first fuel from said first fuel tank and the second fuel from said second fuel tank to form an emulsion fuel;
   emulsion fuel supplying means for supplying the emulsion fuel from said mixing means to an injection pipe between said injection pump and said injection nozzle by way of a check valve; and
   a constant-pressure valve arranged at an exit portion of said injection pump adjacent said injection pipe and having a bidirectional check valve mechanism.

* * * * *